Patented Jan. 16, 1923.

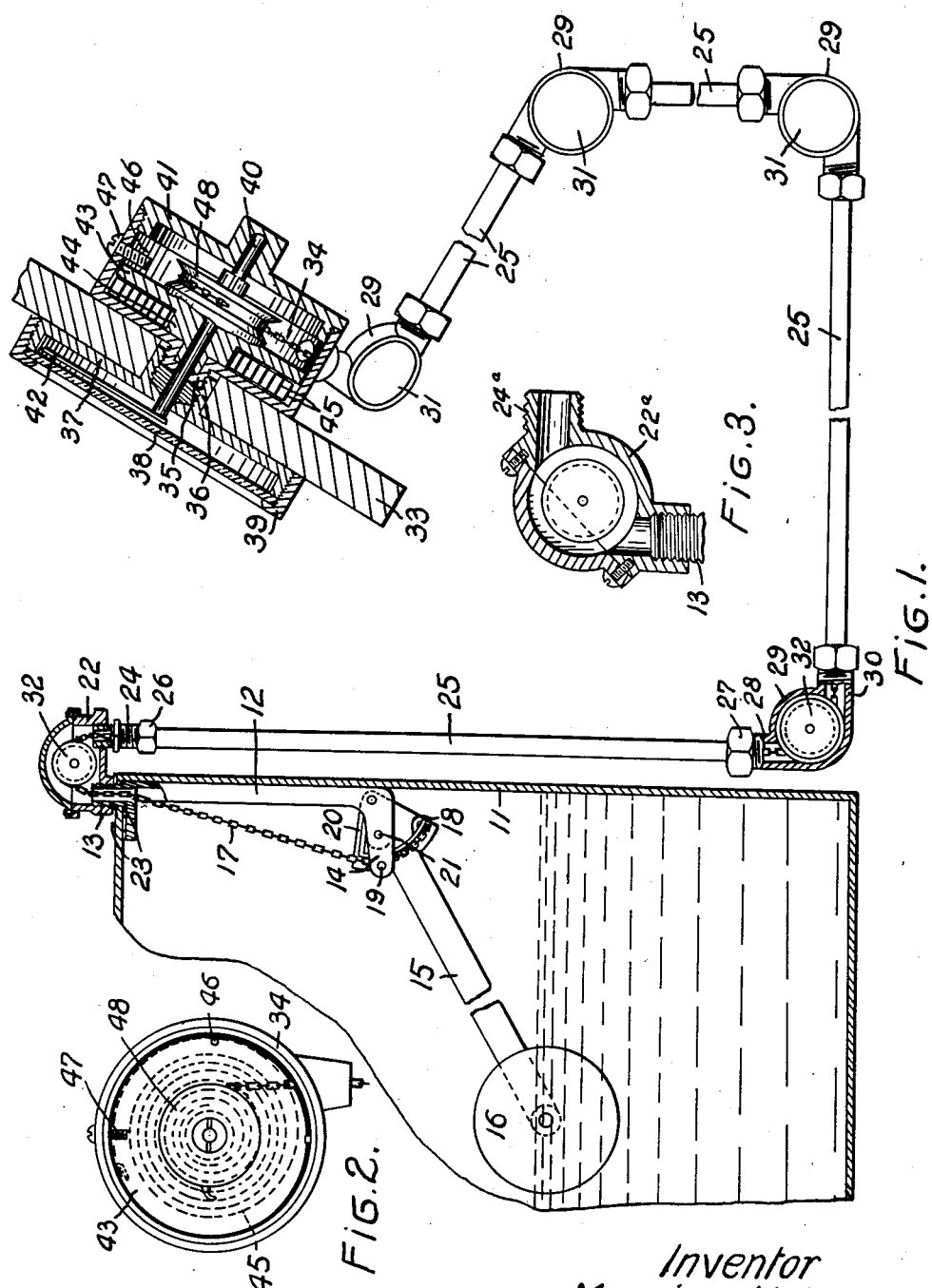

1,442,168

UNITED STATES PATENT OFFICE.

MAURICE METZGER, OF MONTREAL, QUEBEC, CANADA.

GASOLINE GAUGE.

Application filed August 25, 1921. Serial No. 495,176.

*To all whom it may concern:*

Be it known that I, MAURICE METZGER, a subject of the King of Great Britain, and resident of the city of Montreal, in the Province of Quebec, and Dominion of Canada, have invented certain new and useful Improvements in Gasoline Gauges, of which the following is a full, clear, and exact description of the invention.

This invention relates to improvements in gauges for indicating the level of liquids in tanks, and the object of the invention is to provide a simple, durable inexpensive and reliable gauge which may be applied to tanks of various descriptions such as the gasoline tanks of automobiles and motor boats.

A further object is to provide a device in which the level indicating means may be located in any position relatively to the tank.

The device consists briefly of an arm pivoted at one end within a tank and carrying at the opposite end a float, an indicator mounted at any suitable point, and a flexible connection between the float carrying arm and the indicator, which is always maintained in tension by a spring in the indicator and which is enclosed in a conduit of suitable construction.

In the drawings which illustrate the invention:—

Fig. 1 is a view partly in section showing the device connected between a tank and instrument board.

Fig. 2 is a rear elevation of the indicator, the cover having been removed.

Fig. 3 is a sectional view showing a modified form of connection between the conduit and the tank.

Referring more particularly to the drawings, 11 designates a tank within which is mounted a bracket 12 having a hollow threaded nipple 13, which passes out of the tank at or near the top thereof and serves to support the bracket in the tank. The bracket is provided with a pair of jaws 14, between which one end of an arm 15 is pivotally mounted. The opposite end of this arm carries a float 16. A flexible member 17, such as a chain, is connected to the arm intermediate its ends in any suitable manner; for example, by having one of its ends secured to an arcuate flange 18 formed on the arm, the flange forming a tread for the chain in order that the amount of take-up in the chain may have a fixed ratio to the angular movement of the arm 15. One of the jaws 14 is provided with a pin 19 which, with the jaw carrying it, serves to hold the chain on the flange 18. The arm may also be provided with a projection 20 in the path of which a stop pin 21 is provided on one of the arms 14 to limit the downward movement of the arm.

A casing in the form of a capped return band 22 is screwed on to the nipple 13, gaskets 23 being placed between the tank and casing and between the tank and bracket so as to form a fluid tight joint. A nipple 24 is screwed into or forms a part of the casing 22. In the form shown in Figure 1 the nipples 13 and 24 are parallel, so that a complete return bend is formed while in the casing 22ª shown in Figure 3 the nipples 13 and 24ª are at right angles. One end of a tube 25 is connected to the nipple 24 by a coupling 26 and the opposite end connected by a coupling 27 to one arm 28 of a casing 29, having a second arm 30 projecting at any suitable angle to the first and being with the first arm approximately tangent to the casing which is circular. Instead of being capped similarly to the casing 22, the casing 29 may have a side cover 31 pressed or screwed into it. The casings 22 and 29 contain small grooved pulleys 32, over which the chain 17 passes after emerging from the tank through the nipple 13. The chain obviously passes without friction throughout the tube 25 between the casings. Any suitable number of tubes 25 and casings 29 may be connected together to form a conduit following any desired path and leading from the tank to an instrument board 33, in which is mounted the indicator.

The indicator comprises a body 34 having a neck 35 adapted to screw into the neck 36 of a dial 37 mounted on the opposite side of the board from the casing 34. This dial may be provided with a transparent cover 38 retained by a ring 39. A spindle 40 is journalled toward one end in the neck of the casing and at the other end in the cover 41 of the casing. This spindle projects beyond the dial 37 and carries an indicating needle 42. Between its bearings, the spindle 40 carries a disc 43 fixedly mounted thereon and spaced away from the bottom of the casing by a central boss 44. In the space thus formed between the disc and bottom of the casing a spiral spring 45 similar to a clock spring is provided, one end being fixed to the boss 44 and the other to the casing. A stop 46 is provided on the interior of the casing in the path of a stop 47 on the disc, so as to prevent the disc turning through more than one revolution. Rigidly connected to said disc 43 is a grooved pulley 48 in the groove of which the end of the chain 17 is secured.

The installation of the device is extremely simple. A small hole is made in the tank for the nipple 13 and the parts 12, 15 and 16 with the chain attached are assembled and inserted in the tank through the ordinary filling opening, not shown, and the chain then fished up through the opening for the nipple 13, and finally the nipple 13 drawn up through this opening. The casing 22 with its cap removed is threaded on the chain and screwed on the neck. As the remainder of the installation goes together with joints 27 similar to an ordinary pipe union, the pipes 25 and casings 29 may be threaded one at a time on the chain and then connected together without twisting the chain. The necks of the dial and indicator casing are passed through an aperture in the instrument board and screwed together. The conduit is connected up to the casing and the end of the chain brought in and connected to the pulley 48. Before connecting the chain and pulley, the position of the float in the tank is ascertained and the disc 43 rotated to bring the indicator needle into proper position on the dial and also to partially wind up the spring 45. The float and spring will then hold the chain in tension between them, the spring tending to raise the float and turn the needle in one direction and the float tending to drop by gravity and tighten the spring and at the same time moving the needle in the opposite direction.

The operation of the device is extremely simple. When liquid is placed in the tank, it raises the float and consequently the arm, so that the chain tends to slacken. This slackness is immediately taken up by rotation of the pulley 48 under influence of the spring 45, so that the needle 42 is moved in one direction over the dial to indicate a rise in liquid level. As the liquid level drops, the weight of the float depresses the arm and draws on the chain, thus rotating the pulley 48 in the opposite direction and moving the needle over the dial to indicate a lower level. It will be noted that the chain or other connection 17 passes in straight lines between the pulleys 32, over which it passes wherever it is necessary to change the direction. As the parts need not be heavy, the friction is very little and the device will work quite freely. If the spring 45 is strong enough, the conduit may obviously be a continuous tube gradually curved wherever change of direction is necessary. When the tank becomes nearly empty or emptied to a predetermined level, the stop 20 of the arm 15 engages the stop 21 and further downward movement is prevented. This feature is valuable in automobiles and motor boats, as the adjustment may be such that a small amount of gasoline will remain in the tank when the indicator shows an empty tank, which will be sufficient to run the motor for a short time until a fresh supply can be obtained. These stops also relieve the chain and spring of the weight of the float and arm when there is no liquid in the tank to support same.

Having thus described my invention, what I claim is;—

1. In a device of the class described, the combination with a tank of a bracket located therein including a body portion bearing against a side of the tank, a lateral extension bearing against the top of the tank, and a tubular threaded neck passing out of the tank, a hollow member screwed on said neck outside the tank and supporting the bracket, a conduit leading from said casing at a point out of alignment with the bracket neck, a grooved pulley in said casing, an indicating device at the opposite end of said conduit, a float arm carried by the bracket, a float on said arm and an operative connection between said float arm and the indicating device passing through the bracket neck, casing and conduit and over the pulley in said casing.

2. In a device of the class described, the combination with a tank of a bracket therein provided with spaced jaws, a float arm pivoted at one end between said jaws and provided at said end with a stop projection, a complementary projection on one of the jaws disposed in the path of said stop projection to cooperate therewith in limiting swinging movement of the arm in one direction, a float on the other end of said float arm, an indicating device disposed exteriorly of the casing and an operative connection extending between the float arm and the indicating device.

3. In a device of the class described, the combination with a tank, of a bracket therein including a body portion, a float arm pivoted to the lower end of the body, a float on said arm, a lateral extension at the upper end of the body bearing against the top of the tank and formed with an opening, a threaded nipple carried by the extension in line with the opening and passing outwardly through the top of the tank, means threaded on the nipple for engagement with the top of the tank to support the bracket therein, an indicating device disposed exteriorly of the tank, and an operative connection extending between the float arm and indicating device and passing through said nipple.

4. In a device of the class described, the combination with a tank of a bracket therein, spaced jaws carried by the bracket, a float arm pivoted at one end between said jaws and provided at said end with a laterally projecting arcuate flange concentric with the center of arm oscillation, a float on said arm a flexible member connected at one end to said flange and overlying the entire length of the outer curved side of the flange, means carried by one of the jaws for holding the flexible member in position on the flange, and an indicating device to which the opposite end of the flexible member is connected.

5. A device as recited in claim 4, including a stop flange forming a continuation of the arcuate flange and a projection from one of the jaws disposed in the path of the stop flange and cooperating therewith to limit movement of the float arm in one direction.

In witness whereof, I have hereunto set my hand.

MAURICE METZGER.